United States Patent
Horan et al.

(10) Patent No.: US 7,111,469 B2
(45) Date of Patent: Sep. 26, 2006

(54) PROCESS FOR REFRIGERANT CHARGE LEVEL DETECTION USING A NEURAL NET

(76) Inventors: Christopher J. Horan, 3 Nevinwood Pl., Huntington, NY (US) 11743; William J. Stasi, 85-11 262nd St., Floral Park, NY (US) 11001

( * ) Notice: Subject to any disclaimer, the term of this patent is extended or adjusted under 35 U.S.C. 154(b) by 161 days.

(21) Appl. No.: 10/947,483

(22) Filed: Sep. 22, 2004

(65) Prior Publication Data

US 2006/0059925 A1 Mar. 23, 2006

(51) Int. Cl.
   G01K 13/00 (2006.01)
   F25B 41/00 (2006.01)
(52) U.S. Cl. .......................... 62/129; 62/208
(58) Field of Classification Search .................. 62/126, 62/129, 149, 208, 209
   See application file for complete search history.

(56) References Cited

U.S. PATENT DOCUMENTS

| | | | |
|---|---|---|---|
| 4,601,177 A | 7/1986 | Tanino et al. .................. | 62/149 |
| 5,152,152 A | 10/1992 | Brickner et al. ............... | 62/126 |
| 5,253,482 A | 10/1993 | Murway ....................... | 62/175 |
| 5,333,240 A * | 7/1994 | Matsumoto et al. .......... | 706/20 |
| 5,372,015 A * | 12/1994 | Suzuki et al. ............... | 62/228.4 |
| 5,860,286 A | 1/1999 | Tupule ........................ | 62/129 |
| 6,505,475 B1 * | 1/2003 | Zugibe et al. ................ | 62/192 |
| 2006/0042277 A1* | 3/2006 | Sadegh et al. ................ | 62/129 |
| 2006/0059924 A1* | 3/2006 | Horan et al. .................. | 62/129 |

* cited by examiner

*Primary Examiner*—Marc Norman
(74) *Attorney, Agent, or Firm*—Stetina Brunda Garred & Brucker

(57) ABSTRACT

The invention is a process for determining the charge level of a vapor cycle environmental control system, having a condenser, evaporator, and an expansion valve, comprising the steps of providing a neural network having four input neurons, two hidden neurons and three output neurons; determining the number of degrees below the saturation temperature of the liquid refrigerant: exiting the condenser and providing this measurement to the first input neuron; sensing the condenser sink temperature and providing the measurement to the second input neuron; sensing either the refrigerant outlet temperature from the condenser or the evaporator exhaust air temperature and providing the measurement to the third input neuron, sensing the evaporator inlet temperature and providing the measurement to the fourth input neuron; and using the trained neural network to monitor the charge level in the system.

7 Claims, 3 Drawing Sheets

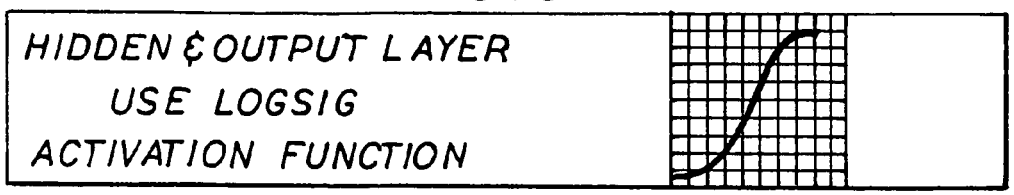
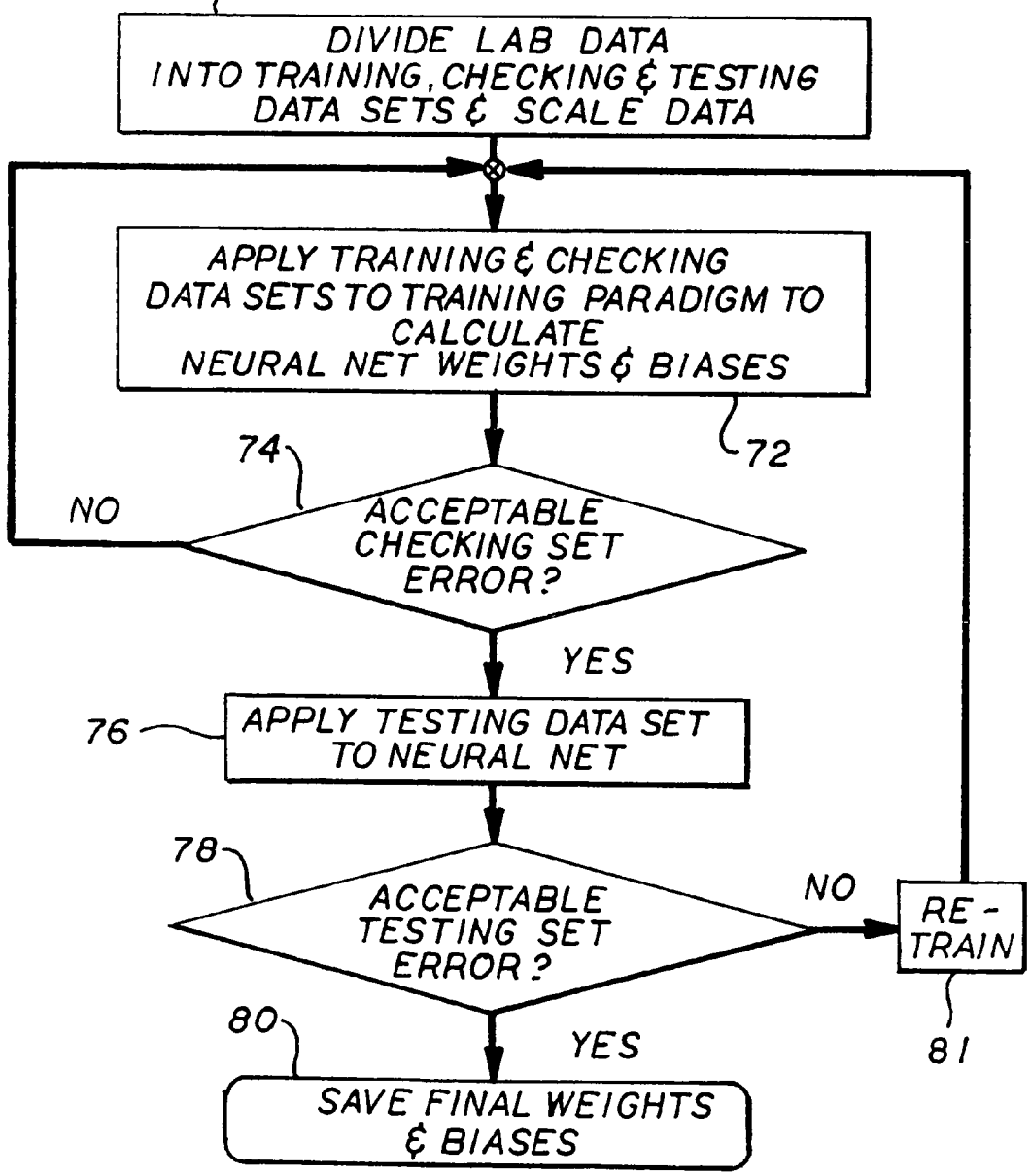

PROCESS FOR REFRIGERANT CHARGE LEVEL DETECTION USING A NEURAL NET

BACKGROUND OF THE INVENTION

1. Field of the Invention

The invention relates to the field of environmental control systems and, in particular, to a process for determining the refrigerant charge level in a sophisticated aircraft environmental control system.

2. Description of Related Art

Modern, lightweight vapor cycle systems sometimes have a shortcoming, which is that it is difficult to detect refrigerant over- and under-charges. Previous systems incorporated receivers and sight glasses, making charge detection possible although not reliable. An efficient, modern system may employ separately controlled compressor speed, evaporator expansion valve, surge control valve, flash sub-cooler expansion valve, and condenser flow control shutters. These many "moving parts" make charge detection by traditional methods (i.e. compressor inlet superheat or condenser outlet sub-cooling measurements) unsuitable. Mechanical charge level indication systems (sight glasses, liquid level indicator, float switch and receiver tank) all rely on measuring the proportion of a liquid versus saturated vapor in a container. This container is located at a position downstream of the condenser heat exchanger that will contain saturated refrigerant (liquid and vapor).

By design, sub-cooled refrigerant (no vapor content) exits the condenser heat exchanger of this vapor cycle system. A tank located at this spot would be full of liquid refrigerant, thus there would be no level to measure. In order to create a location in this system where saturated refrigerant, consisting of a mixture of vapor and liquid, would be present, the condenser heat exchanger would have to be replaced with a separate condenser and sub-cooler. A receiver could then be located between them.

The liquid level in the receiver could then be measured by mechanical means i.e. a sight gage/level switch. For a given charge level, the level in the receiver would vary, depending on ambient conditions and system load. The weight and volume penalty associated with such a design would be undesirable in most cases.

U.S. Pat. No. 5,253,482 Heat Pump Control System by E. Murway describes a scheme in which the receiver is mounted on a weight transducer, allowing the charge level to be monitored. U.S. Pat. No. 4,601,177 Refrigerant Over-Charging System Of Closed Circuit Refrigeration Air Cooling System By M. Taino, et al. describes a valve for charging a refrigeration system, which relies on sensing the liquid level in a receiver to close the valve when the desired liquid level is reached. This scheme prevents overcharging but does not detect undercharges.

Modern vapor cycle systems may incorporate a number of sensors and a microprocessor, which reads a number of system parameters, making some computation-based approaches possible. One such approach is described in U.S. Pat. No. 5,152,152. Method Of Determining Refrigerant Levels by L. R. Brickner, et al. Here, refrigerant charge level is determined by operating the system in a special mode, then comparing the time response of evaporator temperature to "model" responses, collected in controlled conditions with known charge levels.

Yet another system is disclosed in U.S. Pat. No. 5,860,286 System Monitoring Refrigeration Charge by S. Tulpule incorporates a neural network-based approach; this particular invention takes a two-step approach using four layers. The first step is a "Kohonen" type self-organizing network (although not stated as such) consisting of an input layer and a two dimensional "hidden layer" of 4×16 neurons. Individual training patterns are learned in a cluster of neurons surrounding a central neuron. The training methodology is sometimes referred to as "competitive learning" because node weight updating is based on a competition of equally spaced center neurons to see which is initially closest to the input training pattern. There is no activation function on any of these neurons. During operation an unknown input is applied to the net, which finds the three closest stored patterns, which are further processed in the "interpolation" layer, which consists of 16 neurons using a hyperbolic tangent activation. The final single output neuron also uses a hyperbolic tangent activation function.

Thus, it is a primary object of the invention to provide a process for monitoring the charge level of a vapor cycle environmental control system.

It is another primary object of the invention to provide a process for monitoring the charge level of a vapor cycle environmental control system using a back propagation neural net.

It is a further object of the invention to provide a process for monitoring the charge level of a vapor cycle environmental control system using a neural net having a minimum of input neurons.

SUMMARY OF THE INVENTION

The invention is a process for determining the charge level of a vapor cycle environmental control system, having a condenser and evaporator. In detail, the process includes the steps of;

1. Providing a neural network having four input neurons, two hidden neurons and three output neurons;
2. Determining the number of degrees below the saturation temperature of the liquid refrigerant exiting the condenser and providing this measurement to the first input neuron;
3. Sensing the condenser sink temperature and providing the measurement to the second input neuron;
4. Sensing the refrigerant outlet temperature from the condenser and providing the measurement to the third input neuron,
5. Sensing the evaporator return air inlet temperature and providing the measurement to the fourth input neuron; training the neural net by providing under, over and normal refrigerant charge levels to the system and operating the system under varying operating conditions; such that weighting factors for the neural net and post-processing approach are determined; and
6. Using the trained neural network to monitor the charge level in the system.

Prior to processing by the neural net, the inputs are linearly scaled to the range 0.1–0.9, which improves training convergence. The hidden layer of 2 neurons and output layer of 3 neurons have a "logsig" activation function. There is no need for any additional layer to perform interpolation with this approach. The preferred training approach is a Levenberg-Marquardt training paradigm.

The value in each input neuron is multiplied by the "weight" of the connection between that input neuron and a hidden neuron and summed with similar weighted values from the other input neurons. A bias value associated with each hidden neuron is then added. The "logsig" function is then applied to the result for each hidden neuron. Similarly, the outputs of the hidden neurons are multiplied by the respective weights between the hidden and output neurons, summed and biases added. The "logsig" function is applied to the result to produce the output activation levels. Once the neural net has been "trained" it can be used to monitor charge level.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of examples. It is to be expressly understood, however, that the drawings are for purposes of illustration and description only and are not intended as a definition of the limits of the invention.

BRIEF DESCRIPTION OF THE DRAWINGS

FIG. 3 is a graph illustrating the logsig activation function for hidden layer and output layer neurons
FIG. 4 is a flowchart for process of training the neural net.

DESCRIPTION OF THE PREFERRED EMBODIMENT

Figure 1:
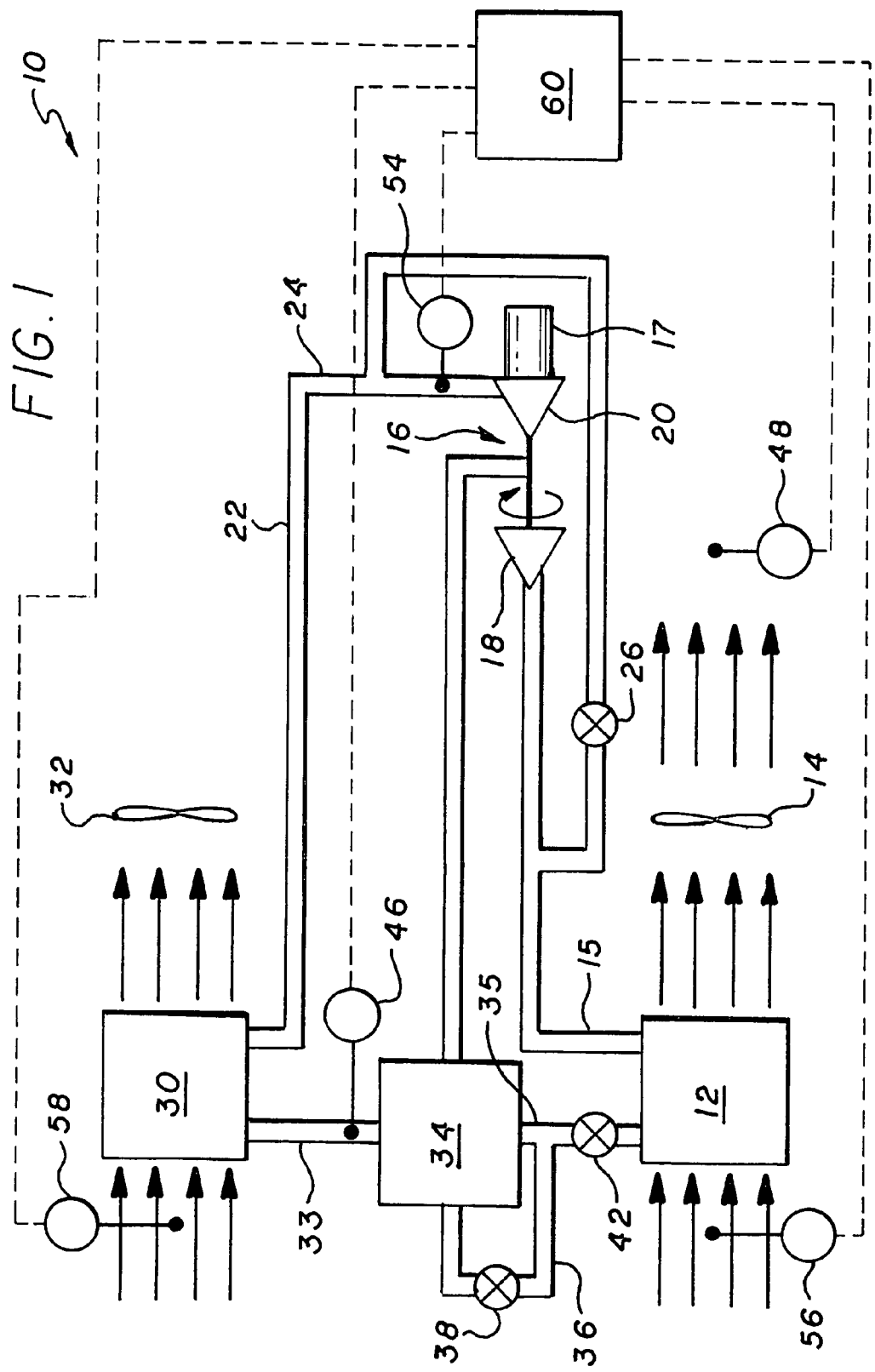
FIG. 1 is a simplified schematic of a vapor cycle environmental control system (air conditioning system).

The vapor cycle system, illustrated in FIG. 1, is a modern, compact system design. Such systems are typically installed in an aircraft and are used for forced air cooling of avionic equipment. During conditions requiring maximum cooling, the refrigerant enters the evaporator 12 as a low temperature mixture of liquid and vapor. In this low pressure side of the refrigeration loop, the pressure remains essentially constant as the refrigerant flows through the evaporator. In the evaporator 12, the liquid portion of the refrigerant evaporates, absorbing heat from the air from the avionics compartment (not shown) pulled there through by the evaporator fan 14. The refrigerant exits the evaporator 12 in line 15 as a superheated vapor and flows to the compressor 16 driven by motor 17. The low pressure vapor enters the first stage 18 of the compressor 16, where it is compressed to a pressure midway between the first stage inlet pressure and second stage 20 discharge pressure.

The hot vapor from compressor second stage 20, now at its highest pressure, flows through line 22. A by pass line 24 having a control valve 26 connects the output line 22 to the line 15. The valve 26 is opened to bypass pressurized refrigerant to the inlet of the compressor to prevent compressor surge. The pressurized refrigerant in line 22 then travels to the condenser 30 where the refrigerant is fully condensed and sub-cooled, rejecting heat to the air drawn through by the condenser fan 32. Note that in flight, the fan 32 is disabled, since ram air will flow through the condenser 30. Notice that, since the refrigerant exits the condenser 30 as a sub-cooled liquid, there is no appropriate location for a receiver in this architecture. The lack of a receiver is one of the main reasons why some of the traditional charge-measuring schemes are not applicable to this system. The liquid refrigerant then exits the condenser 30, via line 33, and flows back toward the evaporator 12.

The refrigerant enters a flash sub-cooler 34 and exits in line 35. The high-pressure liquid refrigerant is further sub-cooled by expanding a small portion of the total flow and allowing it to flow through the cold side passages of the sub-cooler via line 36. A valve 38 in line 36 controls this bypass flow. The expanded bypass flow absorbs heat and becomes a superheated gas. The low pressure vapor exiting the cold side of the sub-cooler 34 mixes with the compressor 16 first stage 18 discharge flow before entering the second stage 20 of the compressor 16. Meanwhile, the sub-cooled liquid that rejected heat in the flash sub-cooler becomes further sub-cooled. Note that under moderate outside temperatures, the valve 38 is closed, and no refrigerant is diverted for flashing, and no further sub-cooling is accomplished in the sub-cooler 34. The refrigerant continues to flow in line 35 to the expansion valve 42, where it expands into a two-phase mixture, down to the low-pressure side of the refrigeration loop. This mixed-phase flow then enters the evaporator 12, and the cycle repeats. This is a typical system and there are numerous variants, but all work on the same general principle.

The following sensors are used to monitor the system.
1. Sensor 46 monitors condenser refrigerant outlet temperature ($T_{CDO}$).
2. Sensor 48 monitors evaporator exhaust air temperature ($T_{EFO}$).
3. Sensor 54 monitors refrigerant pressure at the outlet of the compressor ($P_{CPO}$).
4. Sensor 56 monitors incoming hot air temperature from the avionics ($T_{EVI}$).
5. Sensor 58 monitors incoming cooling air temperature to the condenser ($T_{CDRI}$).

All the sensor outputs as well as all the valves and motor, etc. are fed to a system controller 60, which automatically runs the system 10. Another critical parameter is the condenser outlet sub-cooling. This parameter is calculated by the controller 60, which uses the $T_{CDO}$ and $P_{CPO}$ and refrigerant property tables.

Figure 2:
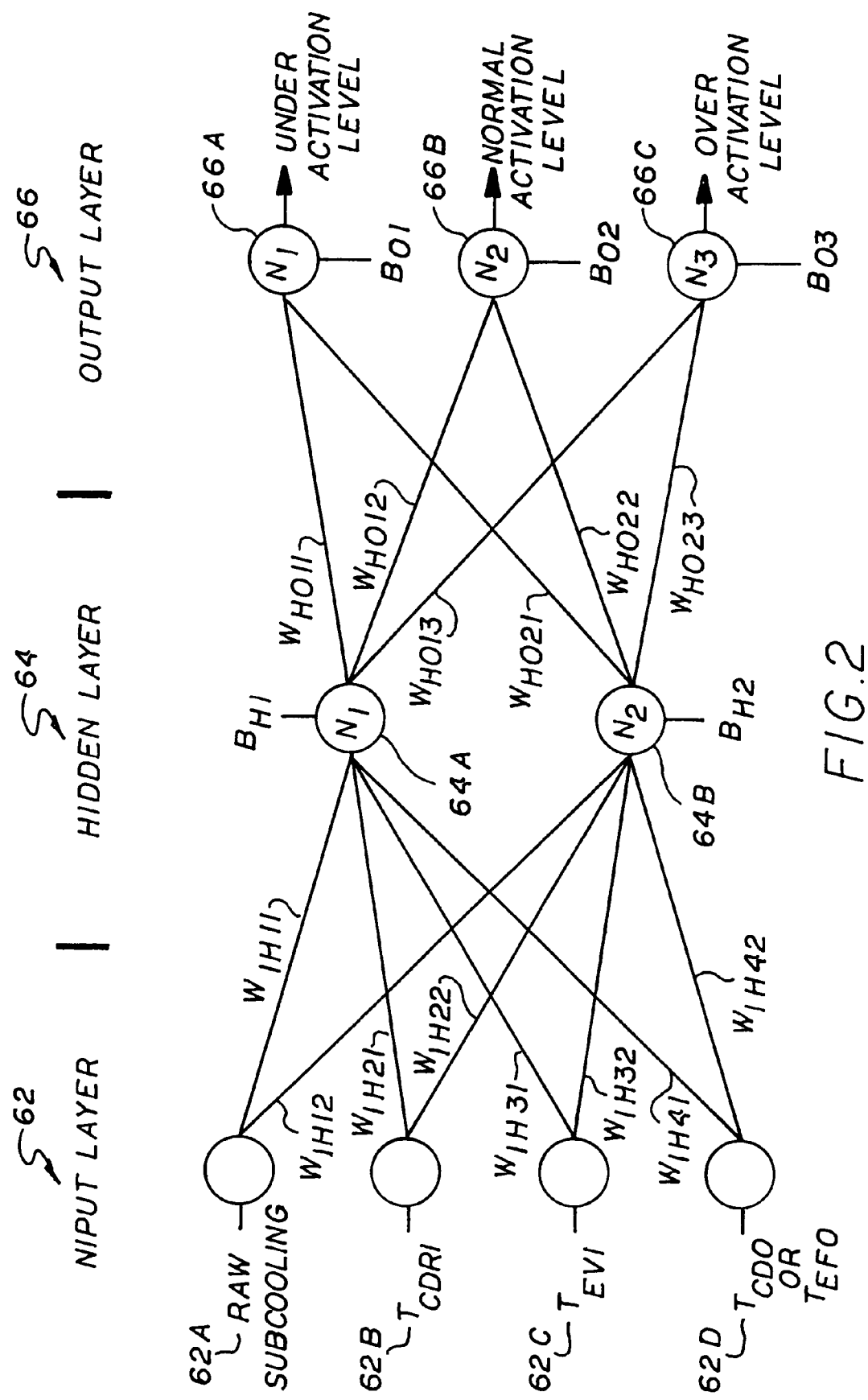
FIG. 2 is a diagram of the neural net used to determine charge level.

FIG. 2 is a schematic of the artificial neural net (ANN). The input layer 62 has four neurons, 62A, 62B, 62C and 62D. The hidden layer 64 has two neurons 64A and 64B, while the output layer 66 has three neurons 66A, 66B and 66C, for indicating undercharge level, normal charge level, and overcharge. In order to determine the weights and biases associated with the ANN, it is necessary to create an appropriate training set. The training of ANN's is old in the art and need not be discussed in great detail. The training set was developed with the goal of duplicating and spanning the likely range of parameter boundary conditions in which the deployed ANN is expected to function. This will determine the ANN:

Input weights $W_{IH11}$, $W_{IH12}$, $W_{IH21}$, $W_{IH22}$, $W_{IH31}$, $W_{IH32}$, and $W_{IH41}$
Output weights $W_{HO11}$, $W_{HO12}$, $W_{HO13}$ $W_{HO21}$, $W_{HO22}$, and $W_{HO23}$
Hidden layer biases $B_{H1}$, and $B_{H2}$
Output layer biases $B_{O1}$, $B_{O2}$, and $B_{O3}$ The system is run through a matrix of load temperatures, sink temperatures, and an appropriate range of charge levels. In our case, we ran charge levels ranging from about 4 pounds below the bottom of the acceptable charge range up to 2 pounds above the top of the acceptable range, in 1 to 2 pound increments. Note that, in this vapor cycle system, the system controller will detect other, secondary faults will occur with extreme high & low charges (i.e. charges outside of our test range); so detection outside of our test range was not necessary or practical. The range of temperatures chosen for the evaporator and condenser air loops were limited to the range of temperatures that will be experienced when the aircraft systems are operated on the ground for maintenance, and further limited by a low temperature limit—our particular system enters a "cold start" state, in which only the evaporator fan and heater operate (i.e. the compressor doesn't start) until the load temperature reaches a prescribed threshold. We used 10 to 30 degree F. increments of temperature for both the load and sink loops.

The resulting data set will contain a number of transients, which may not be useful for training a successful ANN. In our case, the periods during which the 2 pound increments of charge were being added were eliminated, in addition to several minutes after each charge addition. The load and sink temperature increments also represent transients; therefore, we eliminated the data during these transitions, plus several minutes after each transition. The resulting data set was used for training, validating and test the ANN.

FIG. 3 presents a graph illustrating the logsig activation function for the hidden layer and output layer neurons. Of course, other activation functions can be used.

The flow chart for the training process for the ANN is presented in FIG. 4.

Step 70 Divide Test Data—The collected data (discussed previously) is divided into three separate sets for training, checking and testing. Approximately 20% of the data is used to build the training and checking sets and the remainder is used for blind testing of the trained net. The data used in the training and checking data sets is randomly sampled from all the data to insure that it is statistically representative of the overall population. The maximum and minimum value templates for each input parameter are included in the training set which guarantees that all the remaining checking and testing inputs will at worst be equal to the minimum and maximums of the training set. This implies the ANN will be interpolating answers as opposed to extrapolating answers outside its training data bounds. The training set input parameters are linearly scaled to the range (0.1–0.9) prior to training as opposed to the range (0–1). It has been shown in prior art that this scaling range leads to improved training convergence. The scaling factors derived from the training set are used to scale the checking and testing data sets.

Step 72 Apply Training And Checking Data Sets—The training and checking data sets are applied to a neural net training paradigm, which repeatedly cycles through the training set. At each cycle (epoch) the set of neural net weights and biases is adjusted, according to the particular paradigm training law being used, to minimize the error between the actual and ANN estimated training set output. At each epoch, the checking set is applied to the current ANN and the error between the actual and ANN estimated checking output is computed. On average the training error decreases with each epoch; however at some point the checking error ceases to improve or begins to increase.

Step 74 Determine Acceptable Checking Set Error—At this point, the training is halted to avoid over-training the ANN, which would cause poor generalization on untrained data. Many training paradigm algorithms have been developed which can compute the best ANN weights and bias for a given training set. Training algorithms like Conjugate Gradient and Quasi-Newton are just two examples. The Levenberg-Marquardt training algorithm was chosen for this effort because of its speed of convergence at the expense of more memory used, which was not an issue. If No back to Step 72, if Yes then to Step 76.

Step 76 Apply Testing Data To Neural Net—The blind testing set is applied to the trained ANN.

Step 78 Acceptable Test Set Error—if the resulting error is acceptable (Yes) then to Step 80, If not acceptable (No) then to Step 81

Step 80 Save Final Weights And Biases

Step 81 Re-train-Return to Step 72

During vapor cycle system operation, the system controller feeds the ANN all of the required parameters (sensed or calculated) at an appropriate sample rate (approximately 2 seconds apart, in our case). The ANN produces a "raw" charge state estimate for each of these snapshots. A moving average filter averages 25 of these "raw" estimates; this average is then rounded to an integer value corresponding to under, normal, or overcharge. An "N of M" filter follows, in which 60 of 60 of the rounded, averaged estimates must agree before the charge state is reported to the operator. These two post-processing steps are necessary to prevent nuisance faults. Implementation on other vapor cycle systems may adjustments to the length of the moving average and the values for N and M in the N of M filter.

Thus it can be seen, that a simple trained neural net can be used to indicate undercharge, normal charge and overcharge levels (outputs from neurons 66A, 66B and 66C) of refrigerant in a vapor cycle environmental control system.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

INDUSTRIAL APPLICABILITY

The invention has applicability to environmental control systems for stationary, automotive, and aerospace applications.

The invention claimed is:

1. A process for determining the charge level of a vapor cycle environmental control system, having a condenser, evaporator, compressor, and an expansion valve comprising the steps of:

providing a neural network having four input neurons, two hidden neurons and three output neurons;

determining the number of degrees below the saturation temperature of the liquid refrigerant exiting the condenser and providing this measurement to the first input neuron;

sensing the condenser sink temperature and providing the measurement to the second input neuron;

sensing either the refrigerant outlet temperature from the condenser or the evaporator exhaust air temperature and providing the measurement to the third input neuron;

sensing the evaporator air inlet temperature and providing the measurement to the fourth input neuron;

training the neural network by providing under, over and normal refrigerant charge levels to the system and operating the system under varying operating conditions such that weighting factors for the neural network are determined; and using the trained neural network to monitor the charge level in the system.

2. The process as set forth in claim 1 wherein the step of training the neural network by providing under, over and normal refrigerant charge levels to the system and operating the system under varying operating conditions such that weighting factors for the neural network are determined includes the step of applying a log-sig function to each output from each hidden neuron.

3. The process as set forth in claim 1 wherein the step of training the neural network by providing under, over and normal refrigerant charge levels to the system and operating the system under varying operating conditions such that weighting factors for the neural network are determined includes the step of taking an N-point moving average, rounding the result, and requiring N of M of these rounded values to agree before reporting the charge state estimate are defined.

4. A process for determining the charge level of a vapor cycle environmental control system, having a condenser, evaporator, compressor, and an expansion valve comprising the steps:
- determining the number of degrees below the saturation temperature of the liquid refrigerant exiting the condenser;
- sensing the condenser sink temperature;
- sensing either the refrigerant outlet temperature from the condenser or the evaporator exhaust air, and sensing the evaporator air inlet and providing these inputs to a neural network;
- training the neural network by providing under, over and normal refrigerant charge levels to the system and operating the system under varying operating conditions such that weighting factors for the neural network are determined; and
- using the trained neural network to monitor the charge level in the system.

5. The process as set forth in claim 4 wherein the step of providing inputs to a neural network comprises providing a neural network which includes four input neurons, two hidden neurons and three output neurons.

6. The process as set forth in claim 5 wherein the step of training the neural network by providing under, over and normal refrigerant charge levels to the system and operating the system under varying operating conditions such that weighting factors for the neural network are determined includes the step of applying a log-sig function to each output from each hidden neuron.

7. The process as set forth in claim 6 wherein the step of training the neural network by providing under, over and normal refrigerant charge levels to the system and operating the system under varying operating conditions such that weighting factors for the neural network are determined includes the step of taking an N-point moving average, rounding the result, and requiring N of M of these rounded values to agree before reporting the charge state estimate are defined.

* * * * *